(12) United States Patent
Miyakoshi

(10) Patent No.: US 9,235,764 B2
(45) Date of Patent: *Jan. 12, 2016

(54) COMMODITY RECOGNITION APPARATUS AND COMMODITY RECOGNITION METHOD

(71) Applicant: TOSHIBA TEC KABUSHIKI KAISHA, Shinagawa-ku, Tokyo (JP)

(72) Inventor: Hidehiko Miyakoshi, Miyagi-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,510

(22) Filed: Oct. 29, 2013

(65) Prior Publication Data

US 2014/0126772 A1 May 8, 2014

(30) Foreign Application Priority Data

Nov. 5, 2012 (JP) .................................. 2012-243485

(51) Int. Cl.
*G06K 9/00* (2006.01)

(52) U.S. Cl.
CPC ........ *G06K 9/00671* (2013.01); *G06K 2209/17* (2013.01)

(58) Field of Classification Search
None
See application file for complete search history.

(56) References Cited

U.S. PATENT DOCUMENTS

| | | | |
|---|---|---|---|
| 5,324,924 A | 6/1994 | Cai et al. | |
| 6,529,855 B1 | 3/2003 | Gu | |
| 7,246,087 B1 * | 7/2007 | Ruppelt et al. | 705/26.62 |
| 7,486,807 B2 * | 2/2009 | Nagahashi | 382/118 |
| 2003/0039380 A1 * | 2/2003 | Sukegawa et al. | 382/118 |
| 2007/0031010 A1 * | 2/2007 | Sukegawa et al. | 382/118 |
| 2008/0133592 A1 * | 6/2008 | Peters | 707/104.1 |
| 2008/0317294 A1 * | 12/2008 | Hashimoto | 382/115 |
| 2009/0285489 A1 * | 11/2009 | Kanoh | 382/190 |
| 2010/0092093 A1 * | 4/2010 | Akatsuka | G06K 9/6211 382/203 |
| 2010/0141779 A1 * | 6/2010 | Rhoads | G06F 17/30876 348/207.1 |
| 2010/0161566 A1 * | 6/2010 | Adair et al. | 707/690 |
| 2010/0275258 A1 * | 10/2010 | Kamakura | 726/19 |

(Continued)

FOREIGN PATENT DOCUMENTS

| | | |
|---|---|---|
| JP | 06-12514 | 1/1994 |
| JP | 2001-229382 | 8/2001 |

(Continued)

OTHER PUBLICATIONS

Cabarkapa et al (Adaptive content based image retrieval with retrieval with relevance feedback), 2005,IEEE p. 147-150.*

(Continued)

*Primary Examiner* — Nancy Bitar
(74) *Attorney, Agent, or Firm* — Amin, Turocy & Watson, LLP

(57) ABSTRACT

A candidate output element configured to output recognition target commodities as candidates of a recognized commodity in a descending order of the similarity degrees calculated by the similarity degree calculation element, a distance measurement element configured to measure the distance from the image capturing section to a commodity photographed by the image capturing section, and a changing element configured to change the number of candidates of a recognized commodity output by the candidate output element according to the distance measured by the distance measurement element.

6 Claims, 10 Drawing Sheets

(56) References Cited

U.S. PATENT DOCUMENTS

| | | | |
|---|---|---|---|
| 2011/0191327 A1* | 8/2011 | Lee | 707/723 |
| 2012/0099756 A1* | 4/2012 | Sherman | G06Q 30/06 382/100 |
| 2012/0104098 A1* | 5/2012 | Matsuda | G07G 1/0045 235/462.01 |
| 2012/0259701 A1* | 10/2012 | Kumazawa | G06Q 30/0601 705/14.53 |
| 2012/0304267 A1* | 11/2012 | Yamada | 726/7 |
| 2013/0033603 A1* | 2/2013 | Suzuki et al. | 348/148 |
| 2013/0057692 A1* | 3/2013 | Naito et al. | 348/150 |
| 2013/0279748 A1* | 10/2013 | Hastings | G06K 9/46 382/103 |

FOREIGN PATENT DOCUMENTS

| | | |
|---|---|---|
| JP | 2005-318546 | 11/2005 |
| JP | 2010-198137 | 9/2010 |

OTHER PUBLICATIONS

Office Action of Notification of Reasons for Refusal for Japanese Patent Application No. 2012-243485 Dated Sep. 24, 2014, 9 pages.

* cited by examiner

| COMMODITY ID | COMMODITY NAME | FEATURE AMOUNT DATA 0 |
| | | FEATURE AMOUNT DATA 1 |
| | | FEATURE AMOUNT DATA 2 |
| | | FEATURE AMOUNT DATA 3 |
| | | FEATURE AMOUNT DATA 4 |
| | | ⋮ |
| | | FEATURE AMOUNT DATA n |

| MINIMUM PROPER DISTANCE | Dmin |
|---|---|
| MAXIMUM PROPER DISTANCE | Dmax |

COMMODITY RECOGNITION APPARATUS AND COMMODITY RECOGNITION METHOD

CROSS-REFERENCE TO RELATED APPLICATION

This application is based upon and claims the benefit of priority from Japanese Patent Application No. 2012-243485, filed Nov. 5, 2012, the entire contents of which are incorporated herein by reference.

FIELD

Embodiments described herein relate to a commodity recognition apparatus for recognizing a commodity from the image data captured by an image capturing section and a method for recognizing a commodity by the commodity recognition apparatus.

BACKGROUND

There is a technology in which the appearance feature amount of a commodity (object) is extracted from the image data of the commodity photographed by an image capturing section and a similarity degree is calculated by comparing the extracted feature amount with the feature amount data of a reference image previously registered in a recognition dictionary file to recognize the category of the commodity according to the calculated similarity degree. Such a technology for recognizing the commodity contained in the image is called as a general object recognition. As to the technology of the general object recognition, various recognition technologies are described in the following document.

Keiji Yanai "Present situation and future of general object recognition", Journal of Information Processing Society, Vol. 48, No. SIG16 [ Search on Heisei 22 August 10], Internet <URL: http://mm.cs.uec.ac.jp/IPSJ-TCVIM-Yanai.pdf>

In addition, the technology carrying out the general object recognition by performing an area-division on the image for each object is described in the following document.

Jamie Shotton etc., "Semantic Texton Forests for Image Categorization and Segmentation", [Search on Heisei 22 August 10], Internet <URL: http://citeseerx.ist.psu.edu/viewdoc/download?doi=10.1.1.145.3036&rep=rep1&type=pdf>

In recent years, for example, there is a proposal in which the general object recognition technology is applied to a recognition apparatus for recognizing a commodity purchased by a customer, especially, a commodity without a barcode, such as, vegetables, fruits and the like in a checkout system (POS system) of a retail store. However, in a case in which an operator (shop clerk or customer) holds a commodity to be recognized towards an image capturing section, the distance from the image capturing section to the held commodity is not always kept constant. On the other hand, as the number of pixels of the image capturing section is fixed, the resolution of the captured image is varied depending on the distance between the image capturing section and the commodity.

As a result, the similarity degree between the appearance feature amount of the commodity extracted from the captured image and the feature amount data of a reference image is decreased due to the difference in resolution of the captured image and the reference image, which may lead to a low recognition rate.

BRIEF DESCRIPTION OF THE DRAWINGS

FIG. 3 is a schematic view illustrating a structure of dictionary data for each commodity stored in a recognition dictionary file;

FIG. 4 is a schematic view illustrating a structure of proper distance data stored in a proper distance file;

DETAILED DESCRIPTION

In accordance with an embodiment, a commodity recognition apparatus comprises a feature amount extraction element, a similarity degree calculation element, a candidate output element, a distance measurement element and a changing element. The feature amount extraction element extracts appearance feature amount of a commodity contained in the image captured by an image capturing section. The similarity degree calculation element calculates, for each recognition target commodity, a similarity degree representing how much similar the appearance feature amount is to the feature amount data by comparing the appearance feature amount extracted by the feature amount extraction element with the feature amount data which represents surface information of a commodity and is stored in a recognition dictionary file for each recognition target commodity. The candidate output element outputs recognition target commodities as candidates of a recognized commodity in a descending order of the similarity degrees calculated by the similarity degree calculation element. The distance measurement element measures the distance from the image capturing section to a commodity photographed by the image capturing section. The changing element changes the number of the candidates of a recognized commodity output by the candidate output element according to the distance measured by the distance measurement element.

An embodiment of the commodity recognition apparatus is described below with reference to the accompanying drawings. Further, in the present embodiment, a scanner apparatus 1 constituting a store checkout system of a retail store which deals with vegetables, fruits and the like as a commodity has a function of a commodity recognition apparatus.

Figure 1:
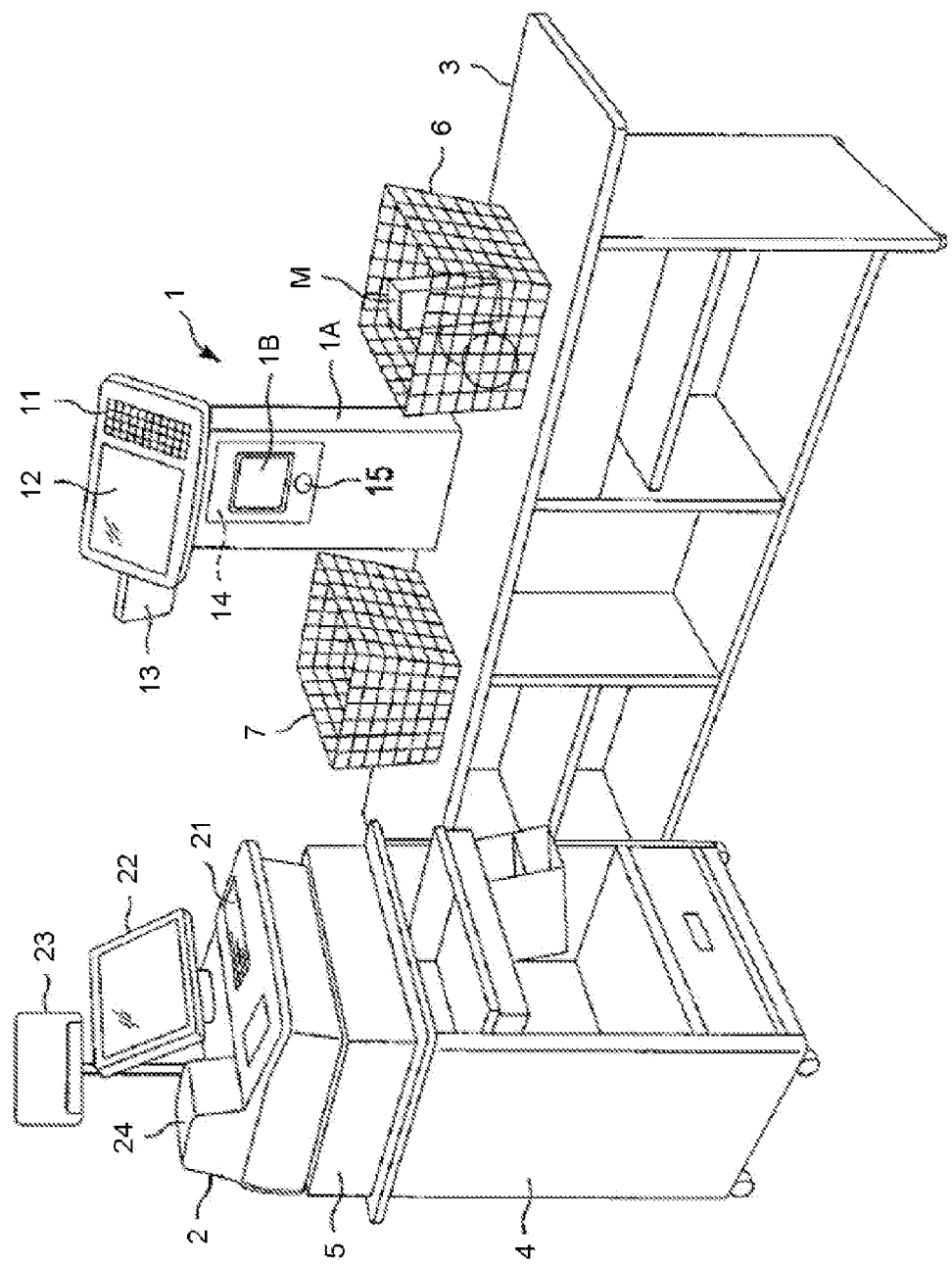
FIG. 1 is an external view of a store checkout system according to an embodiment.

FIG. 1 is an external view of a store checkout system. The system comprises a scanner apparatus 1 functioning as a registration section for registering commodities purchased by a customer and a POS (Point Of Sales) terminal 2 functioning as a settlement section for processing payment of the customer. The scanner apparatus 1 is arranged on a checkout counter 3. The POS terminal 2 is arranged on a register table 4 though a drawer 5. The scanner apparatus 1 is electrically connected with the POS terminal 2 via a communication cable 300 (refer to FIG. 2).

The scanner apparatus 1 comprises a keyboard 11, a touch panel 12 and a display for customer 13. These display and operation devices (keyboard 11, touch panel 12 and display for customer 13) are arranged on a thin rectangular housing 1A constituting a main body of the scanner apparatus 1.

An image capturing section 14 is housed in the housing 1A. A rectangular reading window 1B is formed at the front side of the housing 1A. The image capturing section 14 comprises a CCD (Charge Coupled Device) image capturing element serving as an area image sensor and a drive circuit thereof as well as an imaging lens for focusing an image of an image capturing area on the CCD image capturing element. The image capturing area refers to an area of a frame image which is focused on the area of the CCD image capturing element by the imaging lens through the reading window 1B. The image capturing section 14 outputs an image of the image capturing area focused on the CCD image capturing element through the imaging lens. The image capturing section may be a CMOS (complementary metal oxide semiconductor) image sensor.

A distance sensor 15 serving as a distance measurement element 74 which will be described later is arranged nearby the reading window 1B. The distance sensor 15 measures the distance from the image capturing section 14 to a commodity captured by the image capturing section 14. The distance sensor 15 may be a device in which an infrared ray LED and a phototransistor are combined or a well-known distance sensor using an ultrasonic or laser light.

The POS terminal 2 comprises a keyboard 21, a display for operator 22, a display for customer 23 and a receipt printer 24 required for settlement.

The checkout counter 3 is formed in an elongated-shape along a customer passage at the rear side of the checkout counter. The register table 4 is arranged at substantially right angle to the end of the checkout counter 3 located at the rear side of the end of the checkout counter 3 at the downstream side in the movement direction of a customer moving along the checkout counter 3. The checkout counter 3 and the register table 4 define a space for a shop clerk in charge of settlement, i.e., so called casher.

At the center of the checkout counter 3, the housing 1A of the scanner apparatus 1 is vertically arranged such that the keyboard 11, the touch panel 12 and the reading window 1B are directed to the space for a cashier. The display for customer 13 of the scanner apparatus 1 is arranged on the housing 1A, facing to the customer passage.

A first upper surface portion of the checkout counter 3 at the upstream side of the scanner apparatus 1 in the customer movement direction serves as a space for placing a shopping basket 6 in which an unregistered commodity M purchased by a customer is held. On the other hand, a second upper surface portion at the downstream side of the scanner apparatus 1 serves as an another space for placing a shopping basket 7 in which a commodity M registered by the scanner apparatus 1 is held.

Figure 2:
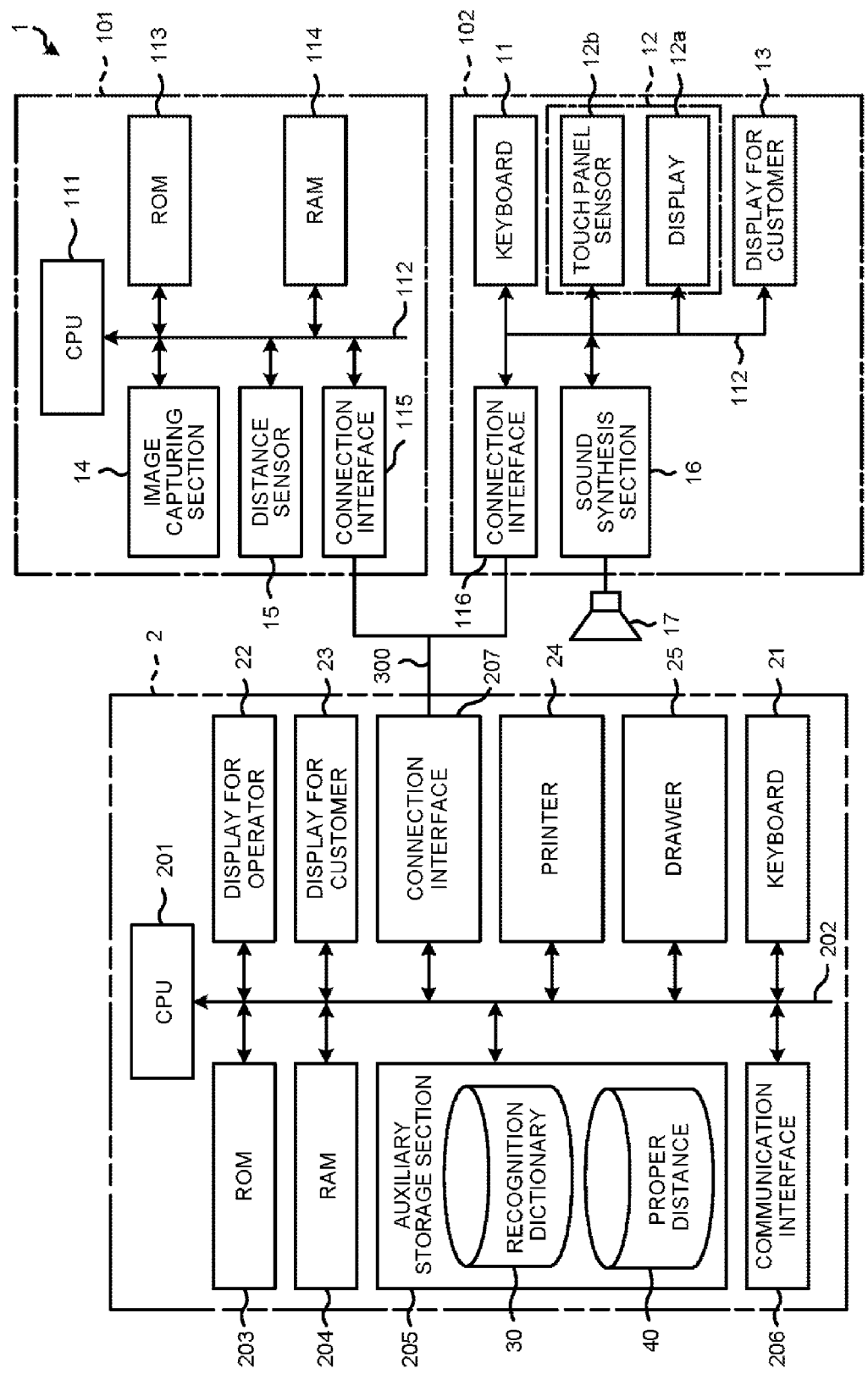
FIG. 2 is a block diagram illustrating hardware arrangement of a scanner apparatus and a POS terminal of the store checkout system shown in FIG. 1.

FIG. 2 is a block diagram illustrating the hardware arrangement of the scanner apparatus 1 and the POS terminal 2. The scanner apparatus 1 comprises a scanner section 101 and an operation-output section 102. The scanner section 101 carries a CPU (Central Processing Unit) 111 as a main body of a control section. The CPU 111 is connected with a ROM (Read Only Memory) 113 and a RAM (Random Access Memory) 114 via a bus line 112 such as an address bus, a data bus and the like. A program, such as a commodity recognition program which will be described later, executed by the CPU 111 is stored in the ROM 113.

The bus line 112 is connected with the image capturing section 14 and the distance sensor 15 via an input-output circuit (not shown). Further the bus line 112 is extended through a connection interface 115 and a connection interface 116, and the keyboard 11, the touch panel 12, and the display for customer 13 are connected with the bus line 112. The touch panel 12 comprises a panel-type display 12a and a touch panel sensor 12b overlaid on the screen of the display 12a. Further, a speech synthesis section 16 is also connected with the bus line 112. The speech synthesis section 16 outputs a speech or voice signal to a speaker 17 according to a command input through the bus line 112. The speaker 17 converts the sound signal to sound and output the sound.

The connection interface 116 and the keyboard 11, the touch panel 12, the display for customer 13 and the speech synthesis section 16 constitute the operation-output section 102. Each section constituting the operation-output section 102 is controlled not only by the CPU 111 of the scanner section 101 but also by a CPU 201 of the POS terminal 2 described below.

The POS terminal 2 also carries a CPU 201 as a main body of a control section. The CPU 201 is connected with a ROM 203, a RAM 204, an auxiliary storage section 205, a communication interface 206 and a connection interface 207 via the bus line 202. In addition, the keyboard 21, display for operator 22, display for customer 23, printer 24 and drawer 5 are respectively connected with the bus line 202 via the input-output circuit (not shown).

The communication interface 206 is connected with a store server (not shown) serving as the center of a store via a network such as a LAN (Local Area Network) and the like. Through this connection, the POS terminal 2 can perform a transmission/reception of data with the store server.

The connection interface 207 is connected with the two connection interfaces 115 and 116 of the scanner apparatus 1 via the communication cable 300. Through the connection, the POS terminal 2 receives information from the scanner section 101 of the scanner apparatus 1. In addition, the POS terminal 2 performs a transmission/reception of data signals with the keyboard 11, the touch panel 12, the display for customer 13 and the speech synthesis section 16, which constitute the operation-output section 102 of the scanner apparatus 1. On the other hand, through the connection, the scanner apparatus 1 makes an access to a data file stored in the auxiliary storage section 205 of the POS terminal 2.

The auxiliary storage section 205, which is, for example, an HDD (Hard Disk Drive) device or an SSD (Solid State Drive) device, stores data files such as a recognition dictionary 30 and a proper distance file 40 in addition to various programs.

FIG. 3 is a schematic view illustrating a structure of dictionary data for each commodity stored in the recognition dictionary file 30. As shown in FIG. 3, a plurality of feature amount data for each commodity subjected to the recognition are stored in the recognition dictionary file 30 in association with the commodity ID for identifying the commodity and the commodity name. The feature amount data is obtained by extracting appearance feature amount, that is, surface information (an appearance shape, a color or hue, a pattern, a concave-convex and the like) of a commodity from a captured reference image of a commodity identified with the corresponding commodity ID. The feature amount data represents the appearance feature amount in the form of parameters. A plurality of feature amount data (0 to n) of a commodity observed from different directions for one commodity are stored. However, the number of the feature amount data of a commodity (n+1) is not fixed. For example, the number of the feature amount data (n+1) is different from one another according to various kinds of commodities. Further, commodity name is not necessarily contained in the dictionary data for each commodity.

FIG. 4 is a schematic view illustrating a structure of the proper distance data stored in a proper distance file 40. As shown in FIG. 4, a minimum proper distance value Dmin and a maximum proper distance value Dmax greater than the minimum value Dmin (Dmin<Dmax) are stored in the proper distance file 40. There is a proper range for the distance between a commodity which is photographed by the image capturing section 14 and the image capturing section 14. The minimum value of the proper range is the minimum proper distance value Dmin, and the maximum value of the proper range is the maximum proper distance value Dmax. The proper range is described.

Figure 5:
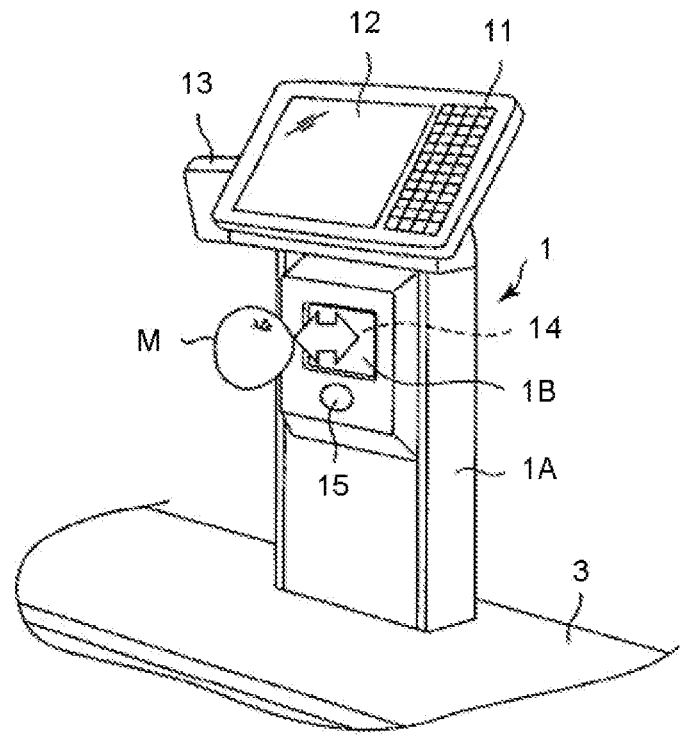
FIG. 5 is a schematic view illustrating a state in which a commodity is held to a reading window of the scanner apparatus and an example of a frame image captured in this state.
Figure 5:
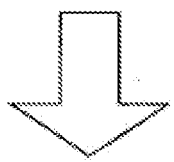
Figure 5:
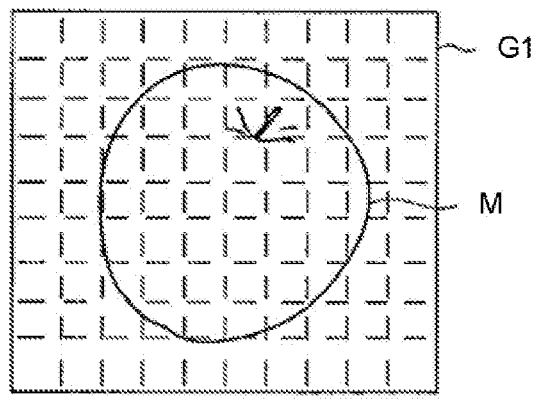
Figure 6:
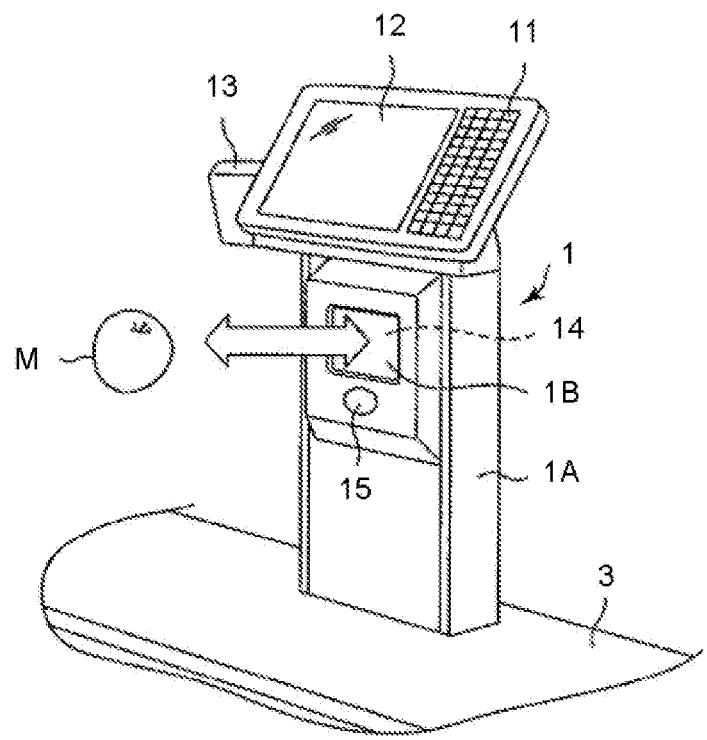
FIG. 6 is a schematic view illustrating a state in which a commodity is held to the reading window of the scanner apparatus and an example of a frame image captured in this state.
Figure 6:
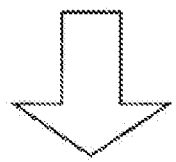
Figure 6:
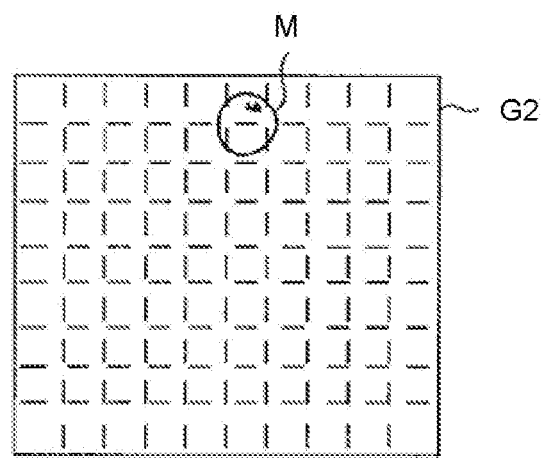

FIG. 5 and FIG. 6 are schematic views illustrating a state in which a commodity (apple) M is held to the reading window 1B of the scanner apparatus 1 and examples of frame images G1 and G2 captured in this state. FIG. 5 illustrates a case where the distance between the reading window 1B and the commodity M is short (distance=d1), and FIG. 6 illustrates a case where the distance between the reading window 1B and the commodity M is far (distance=d2: d2>d1).

It can be understood by comparing the frame image G1 shown in FIG. 5 with the frame image G2 shown in FIG. 6 that the commodity M is imaged in a bigger size with respect to the size of the frame image G1 if the distance between the reading window 1B and the commodity M is short and the commodity M is imaged in a smaller size with respect to the size of the frame image G2 if the distance between the reading window 1B and the commodity M is far. As a result, if the frame image G1 and the frame image G2 are distinguished with cells of the same size in a grid form, the number of the cells imaging the commodity M in a case in which the distance between the reading window 1B and the commodity M is far is smaller than that of the cells imaging the commodity PI in a case in which the distance between the reading window 1B and the commodity M is short. That is, the resolution of the commodity M imaged in the frame image G1 is high if the distance between the reading window 1B and the commodity M is short and low if the distance between the reading window 1B and the commodity M is far.

On the other hand, each feature amount data of a dictionary data for each commodity stored in the recognition dictionary file 30 is obtained as follows. A frame image serving as a reference image is obtained by photographing a commodity with an image capturing element which is separated from the commodity at a substantially given distance, and the reference image is sub-divided in a grid form. Then, the appearance feature amount, that is, surface information (the appearance shape, color or hue, pattern, concave-convex and the like) of the commodity is extracted for each image in the grids and parameterized to generate each feature amount data. Therefore, in the technology of the general object recognition, there is a tendency that the closer the resolution of an image captured by the image capturing section is to the resolution of a reference image, the higher the recognition rate is.

In the present embodiment, taking the distance D between the image capturing section and a commodity when capturing a reference image as a reference, a range from D+α1 to D−α2 is set as a proper range within which a recognition rate above a specific rate can be obtained. That is, the maximum value Dmax of the proper range is TD+α1', and the minimum value Dmin of the proper range is 'D−α2'.

Figure 7:
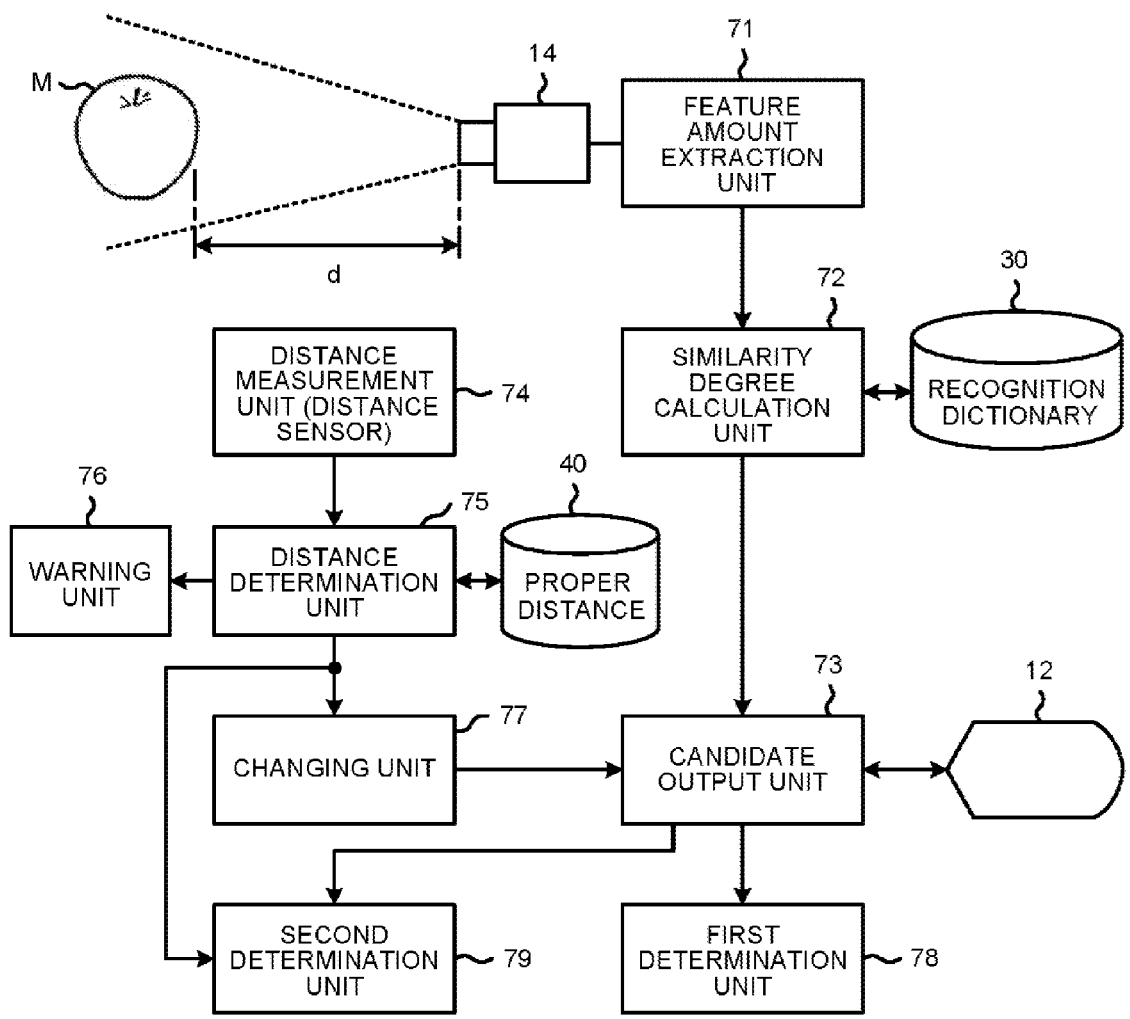
FIG. 7 is a block diagram illustrating functions of a scanner apparatus serving as a commodity recognition apparatus.

FIG. 7 is a block diagram illustrating functions as a commodity recognition apparatus. In the present embodiment, the scanner apparatus 1 has the functions. That is, in the scanner apparatus 1, a feature amount extraction element 71, a similarity degree calculation element 72, a candidate output element 73, a distance measurement 74, a distance determination element 75, a warning element 76, a changing element 77, a first determination element 78 and a second determination element 79 are arranged to realize functions from the recognition to the determination of a commodity M held in the image capturing area of the image capturing section 14 as a sales commodity.

The feature amount extraction element 71 extracts the appearance feature amount of a commodity M contained in an image captured by the image capturing section 14. The similarity degree calculation element 72 calculates, for each commodity subjected to the recognition, a similarity degree representing how much similar the appearance feature amount is to the feature amount data by comparing the appearance feature amount extracted by the feature amount extraction element 71 with the feature amount data of the recognition dictionary file 30. The candidate output element 73 outputs to display recognition target commodities as candidates of a recognized commodity in a descending order of the similarity degrees calculated by the similarity degree calculation element 72 on the touch panel 12 in a selectable manner.

The distance measurement element 74 (distance sensor 15) measures the distance d from the image capturing section 14 to the commodity M photographed by the image capturing section 14. The distance determination element 75 determines whether or not the distance d measured by the distance measurement unit 74 is a proper value with reference to the proper distance data (Dmax, Dmin) stored in the proper distance file 40. Specifically, the distance d is determined to be a proper value if the distance d is in a range from the minimum proper distance Dmin to the maximum proper distance Dmax, and is determined to be an improper value, otherwise.

The warning element 76 outputs a warning if the distance determination element 75 determines that the distance d is not a proper value. For example, an image warning that the distance d is not a proper value is displayed on the touch panel 12. Alternatively, a speech guidance warning that the distance d is not a proper value is output from the speaker 17.

The changing element 77 changes the number of the candidates of a recognized commodity output by the candidate output element 73 according to the distance d measured by the distance measurement element 74. Specifically, the number of the candidates of a recognized commodity obtained in case that the distance determination 75 determines that the distance d is a proper value is decreased compared with than that obtained in case that the distance determination element 75 determines that the distance d is not the proper value. For example, the number of the candidates is set to be 6 if the distance d is not a proper value, and the number of the candidates is set to be 3 if the distance d is a proper value.

The first determination element 78 determines the commodity selected from the commodities displayed on the touch panel 12 as a candidate of the recognized commodity to be a commodity photographed by the image capturing section 14, that is, a sales commodity. The second determination element 79 determines, in a case in which the distance d is determined by the distance determination element 75 to be a proper value and the highest similarity degree of the commodity output by the candidate output element 73 as a candidate of the recognized commodity is above a preset determination threshold value, the commodity having the highest similarity degree to be a commodity photographed by the image capturing section 14, that is, a sales commodity.

The units 71-79 are realized by the CPU 111 of the scanner apparatus 1 which operates in accordance with a commodity recognition program. When the commodity recognition program is started, the CPU 111 of the scanner apparatus 1 controls each section with a procedure shown in the flowchart of FIG. 8. First, the CPU 111 resets an initial flag F0 and a within-range flag F1 described later to be 0 (ACT ST1). The initial flag F0 and the within-range flag F1 are stored in the RAM 114. Further, the CPU 111 outputs an ON-signal of image capturing to the image capturing section 14 (ACT ST2). The image capturing section 14 starts image capturing of an image capturing area according to the ON-signal of image capturing. The frame images of the image capturing area captured by the image capturing section 14 are sequentially stored in the RAM 114. Further, ACT ST1 and ACT ST2 may be carried out in a reverse order.

The CPU 111 outputting the ON-signal of image capturing reads a frame image stored in the RAM 114 (ACT ST3). Then, the CPU 111 confirms whether or not a commodity is contained in the frame image (ACT ST4). Specifically, the CPU 111 extracts an outline from a binary image of the frame image. Then, the CPU 111 tries to extract the outline of an object imaged in the frame image. If the outline of the object is extracted, the CPU 111 regards the image in the outline as a commodity.

If a commodity is not contained in the frame image (NO in ACT ST4), the CPU 111 acquires a next frame image from the RAM 114 (ACT ST3). Then, the CPU 111 confirms whether or not a commodity is contained in the frame image (ACT ST4).

If a commodity M is contained in the next frame image (YES in ACT ST4), the CPU 111 extracts the appearance feature amount, such as the shape, the surface hue, the pattern and the concave-convex, of the commodity M from the image in the outline (ACT ST5: feature amount extraction element 71). Further, the CPU 111 operates the distance sensor 15 to measure the distance d from the image capturing section 14 to the commodity M (ACT ST6: distance measurement element 74). The processing in ACT ST5 and ACT ST6 may be carried out in a reverse order.

The CPU 111 starts a distance warning processing (ACT ST7) when the appearance feature amount of the commodity M and the distance d from the image capturing section 14 to the commodity M are acquired. Further, the CPU 111 starts a recognition processing (ACT ST8). Then, the CPU 111 waits for the ending of the distance warning processing and the recognition processing (ACT ST9).

Figure 9:
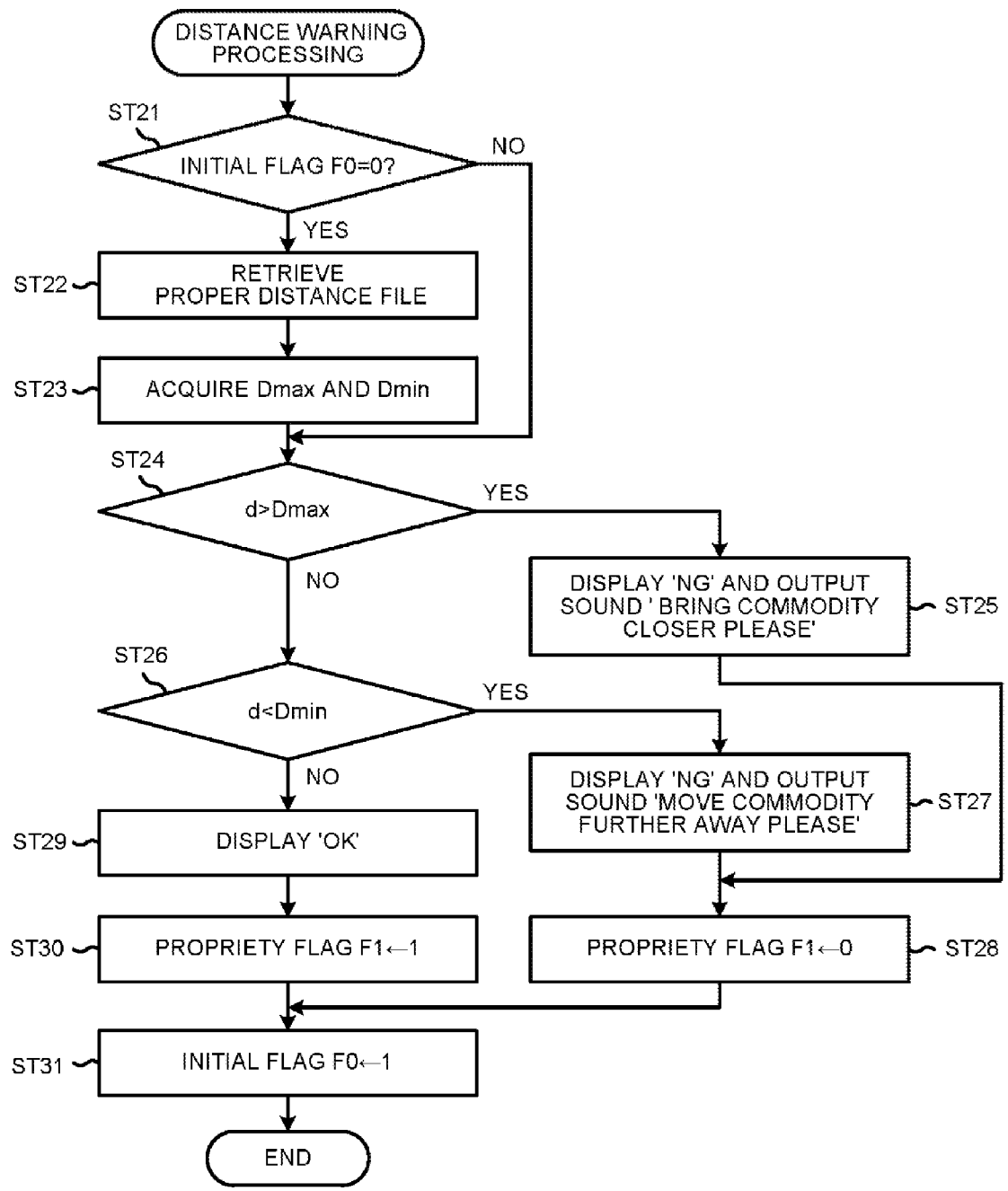
FIG. 9 is a flowchart specifically illustrating a procedure of a distance warning processing.

FIG. 9 is a flowchart illustrating a procedure of the distance warning processing. First, the CPU 111 confirms whether or not the initial flag F0 is reset to 0. The initial flag F0 is reset to 0 in the first distance warning processing. In this case (YES in ACT ST21), the CPU 111 accesses the auxiliary storage section 205 of the POS terminal 2 connected via the connection interface 115 and retrieves the proper distance file (ACT ST22). Then, the CPU 111 reads the maximum proper distance Dmax and the minimum proper distance Dmin from the proper distance file 40 (ACT ST23). If the initial flag F0 is set to be 1 (NO in ACT ST21), the CPU 111 does not execute the processing in ACT ST22 and ACT ST23 because the distance warning processing is carried out at more than twice.

Next, the CPU 111 confirms whether or not the distance d measured by the distance sensor 15 is greater than the maximum proper distance Dmax (ACT ST24: distance determination element 75). If the distance d is greater than the maximum proper distance Dmax (YES in ACT ST24), the CPU 111 displays a mark or a character, such as 'NG', representing that the distance is not proper, on the display 12a. Further, the CPU 111 operates the speech synthesis section 16 to output speech guidance to warn that the distance is too far, such as a speech 'bring the commodity closer please' (ACT ST25: warning element 76). Then, the CPU 111 resets the within-range flag F1 to 0 (ACT ST28).

On the contrary, if the distance d is not greater than the maximum proper distance Dmax (NO in ACT ST24), the CPU 111 confirms whether or not the distance d is smaller than the minimum proper distance Dmin (ACT ST26: distance determination element 75). If the distance d is smaller than the minimum proper distance Dmin (YES in ACT ST26), the CPU 111 displays a mark or character, such as 'NG', representing that the distance is not proper, on the display 12a. Further, the CPU 111 operates the speech synthesis section 16 to output speech guidance to warn that the distance is too short, such as a speech 'move the commodity away please' (ACT ST27: warning element 76). Then, the CPU 111 resets the propriety flag F1 to 0 (ACT ST28).

The processing in ACT ST24 and ACT ST26 may be carried out in a reverse order. That is, the CPU 111 first confirms whether or not the distance d is smaller than the minimum proper distance Dmin and executes the processing in ACT ST27 if the distance d is smaller than the minimum proper distance Dmin. On the other hand, the CPU 111 confirms whether or not the distance d is greater than the maximum proper distance Dmax if the distance d is greater than the minimum proper distance Dmin and executes the processing in ACT ST25 if the distance d is greater than the maximum proper distance Dmax.

It is not limited that the within-range flag F1 is reset to 0 after the processing in ACT ST25 or ACT ST27 is carried out, but it may be carried out before the processing in ACT ST25 or ACT ST27 is carried out.

On the other hand, if the distance d is not greater than the maximum proper distance Dmax (NO in ACT ST24) but is greater than the minimum proper distance Dmin (NO in ACT ST26), the distance d is proper. In this case, the CPU 111 displays a mark or character, such as 'OK', representing that the distance is proper, on the display 12a (ACT ST29). Further, the CPU 111 sets the within-range flag F1 to be 1 (ACT ST30). The processing in ACT ST29 and ACT ST30 may be carried out in a reverse order.

In this way, the CPU 111 sets the initial flag F0 to be 1 (ACT ST31) if the within-range flag F1 is set or reset in ACT ST28 or ACT ST30. Then, the current distance warning processing is ended. The setting timing of the initial flag F0 is not limited to this, it may be set immediately before the processing in ACT ST24 is carried out.

Figure 10:
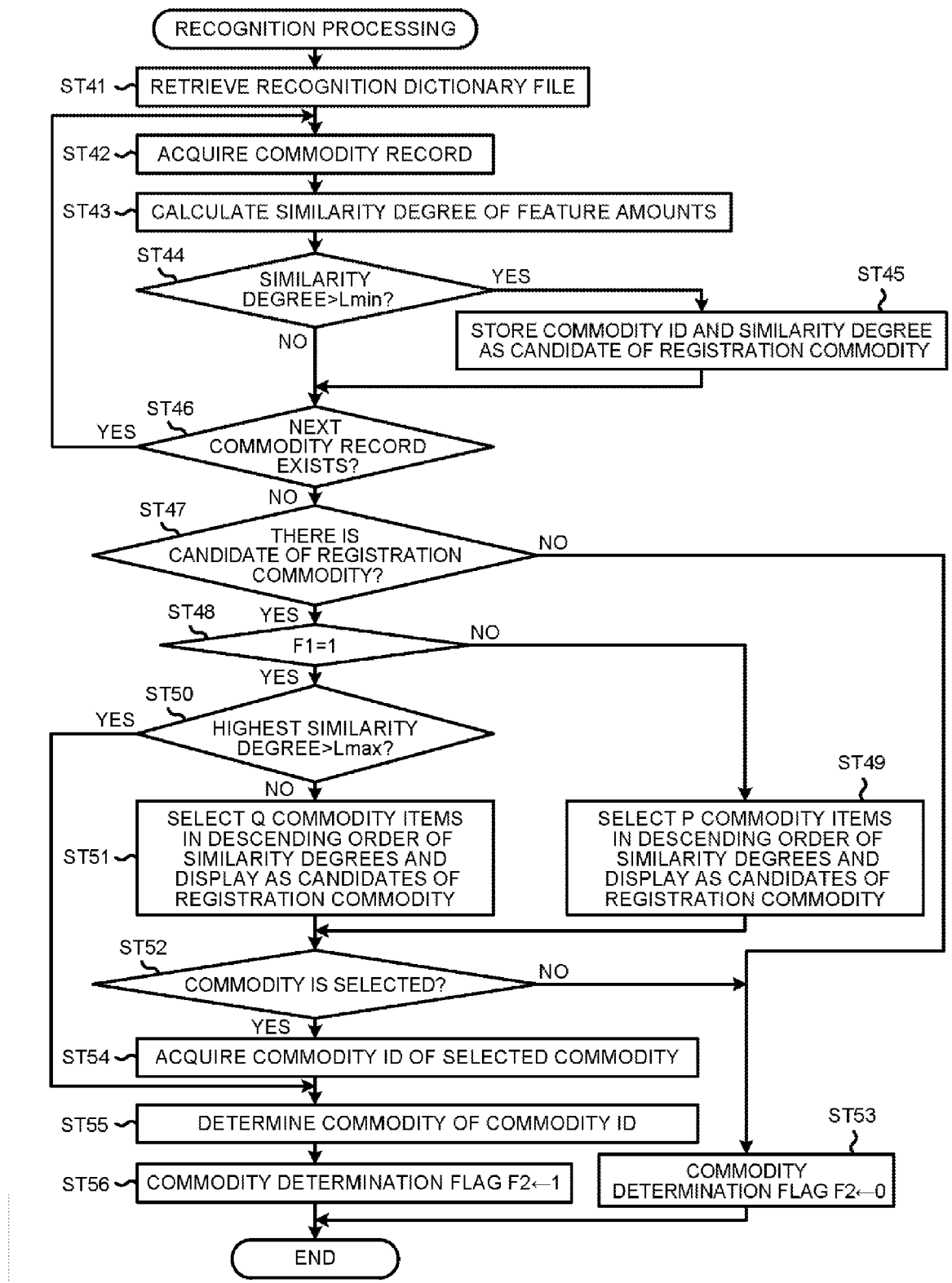
FIG. 10 is a flowchart specifically illustrating a procedure of a recognition processing.

FIG. 10 is a flowchart illustrating a procedure of a recognition processing. First, the CPU 111 accesses the auxiliary storage section 205 of the POS terminal 2 connected via the connection interface 115 and retrieves the recognition dictionary file 30 (ACT ST41). Then the CPU 111 reads a data record (commodity ID, commodity name, feature amount data 0-n) of one commodity from the recognition dictionary file 30 (ACT ST42).

If the data record is read, the CPU 111 calculates, for each feature amount data 0-n of the record, a similarity degree representing how similar the appearance feature amount of the commodity extracted in the processing in ACT ST5 is to the feature amount data 0-n. Then, the CPU 111 determines the highest similarity degree calculated for each feature amount data 0-n as the similarity degree between a commodity specified with the commodity ID in the record and a detected commodity M (ACT ST43: similarity degree calculation element 72). The determined similarity degree may be a total value or an averaged value of the similarity degrees calculated for each feature amount data 0-n, but not the highest similarity degree in the similarity degrees calculated for each feature amount data 0-n.

The CPU 111 confirms whether or not the similarity degree determined in the processing in ACT ST43 is greater than a preset candidate threshold value Lmin (ACT ST44). If the similarity degree is not greater than the candidate threshold value Lmin (NO in ACT ST44), the CPU 111 carries out the processing in ACT ST46.

If the similarity degree is greater than the candidate threshold value Lmin (YES in ACT ST44), the CPU 111 stores the commodity ID of the record and the similarity degree in the RAM 114 as a data of a candidate of registration commodity (candidate of a recognized commodity) (ACT ST45). Then, the CPU 111 carries out the processing in ACT ST46.

In ACT ST46, the CPU 111 confirms whether or not there is unprocessed data record in the recognition dictionary file 30. If there is an unprocessed data record in the recognition dictionary file 30 (YES in ACT ST46), the CPU 111 returns to execute the processing in ACT ST42. That is, the CPU 111 reads the unprocessed data record from the recognition dictionary file 30 to execute the processing in ACT ST43-ACT ST45.

If there is no unprocessed data record in the recognition dictionary file 30, that is, the retrieval in the recognition dictionary file 30 is ended (NO in ACT ST46), the CPU 111 confirms whether or not data of candidates of a registration commodity is stored in the RAM 114 (ACT ST47). If data of candidates of a registration commodity is not stored in the RAM 114 (NO in ACT ST47), the CPU 111 carries out the processing in ACT ST53.

If the data of candidates of a registration commodity is stored in the RAM 114 (YES in ACT ST47), the CPU 111 confirms whether or not the within-range flag F1 is set to be 1 (ACT ST48). If the within-range flag F1 is not set to be 1 (NO in ACT ST48), the CPU 111 selects, in the descending order of similarity degrees, the top P (P>2) commodity items from the data of candidates of a registration commodity stored in the RAM 114 (changing element 77). Then, the CPU 111 displays the selected top P commodity items on the display 12a as a commodity list of candidates of a registration commodity (ACT ST49: candidate output element 73).

If the within-range flag F1 is set to be 1 (YES in ACT ST48), the CPU 111 confirms whether or not the highest similarity degree of the data of candidates of a registration commodity stored in the RAM 114 is greater than a preset determination threshold value Lmax (Lmax>Lmin) (ACT ST 50). If the highest similarity degree is not greater than the determination threshold value (NO in ACT ST50), the CPU 111 selects, in a descending order of similarity degrees, the top Q (P>Q>1) commodity items from the data of candidates of a registration commodity stored in the RAM 114 (changing element 77). Then, the CPU 111 displays the selected top Q commodity items on the display 12a as a commodity list of candidates of a registration commodity (ACT ST51: candidate output element 73).

After a commodity list of candidates of a registration commodity is displayed on the display 12a in ACT ST49 or ACT ST51, then the CPU 111 confirms whether or not a commodity is optionally selected from the commodity list (ACT ST52). For example, the CPU 111 proceeds to carry out the processing in ACT ST53 if a re-retrieve key on the keyboard 11 is input to declare no selection on a commodity (NO in ACT ST52).

In ACT ST53, the CPU 111 sets a commodity determination flag F2 to be 0. Then, the CPU 111 ends the current recognition processing.

On the other hand, if one commodity is optionally selected from the commodity list of candidates of a registration commodity by operating the touch panel 12 or the keyboard 11 (YES in ACT ST52), the CPU 111 acquires the commodity ID of the selected commodity from the RAM 114 (ACT ST54). Then, the CPU 111 determines the acquired commodity ID as the commodity ID of the sales commodity and sends the acquired commodity ID to the POS terminal 2 via the communication cable 300 (ACT ST55: first determination element 78). Further, the CPU 111 sets the commodity determination flag F2 to be 1 (ACT ST56). Then, the CPU 111 ends the current recognition processing.

Further, if the highest similarity degree of the data of candidates of a registration commodity is determined to be greater than the determination threshold value Lmax in ACT ST50 (YES in ACT ST50), the CPU 111 acquires the commodity ID of the commodity having the highest similarity degree from the RAM 114. Then, the CPU 111 determines the acquired commodity ID as the commodity ID of the sales commodity and sends the acquired commodity ID to the POS terminal 2 via the communication cable 300 (ACT ST55: second determination element 79). Further, the CPU 111 sets the commodity determination flag F2 to be 1 (ACT ST56). Additionally, the processing in ACT ST54 and ACT ST55 may be carried out in a reverse order. Then, the CPU 111 ends the current recognition processing.

When the distance warning processing and the recognition processing are both ended (YES in ACT ST9), the CPU 111 confirms whether or not the commodity determination flag F2 is set to be 1 (ACT ST10). If the commodity determination flag F2 is not set to be 1 (NO in ACT ST10), the CPU 111 returns to ACT ST3. That is, the CPU 111 acquires other frame images stored in the RAM 114 (ACT ST3). Then, the CPU 11 executes the processing following ACT ST4 again.

If the commodity determination flag F2 is set to be 1 (YES in ACT ST10), the CPU 111 outputs an OFF-signal of image capturing to the image capturing section 14 (ACT ST11). The image capturing section 14 ends image capturing in response to the OFF-signal of image capturing. Then, the commodity recognition program is ended.

Figure 8:
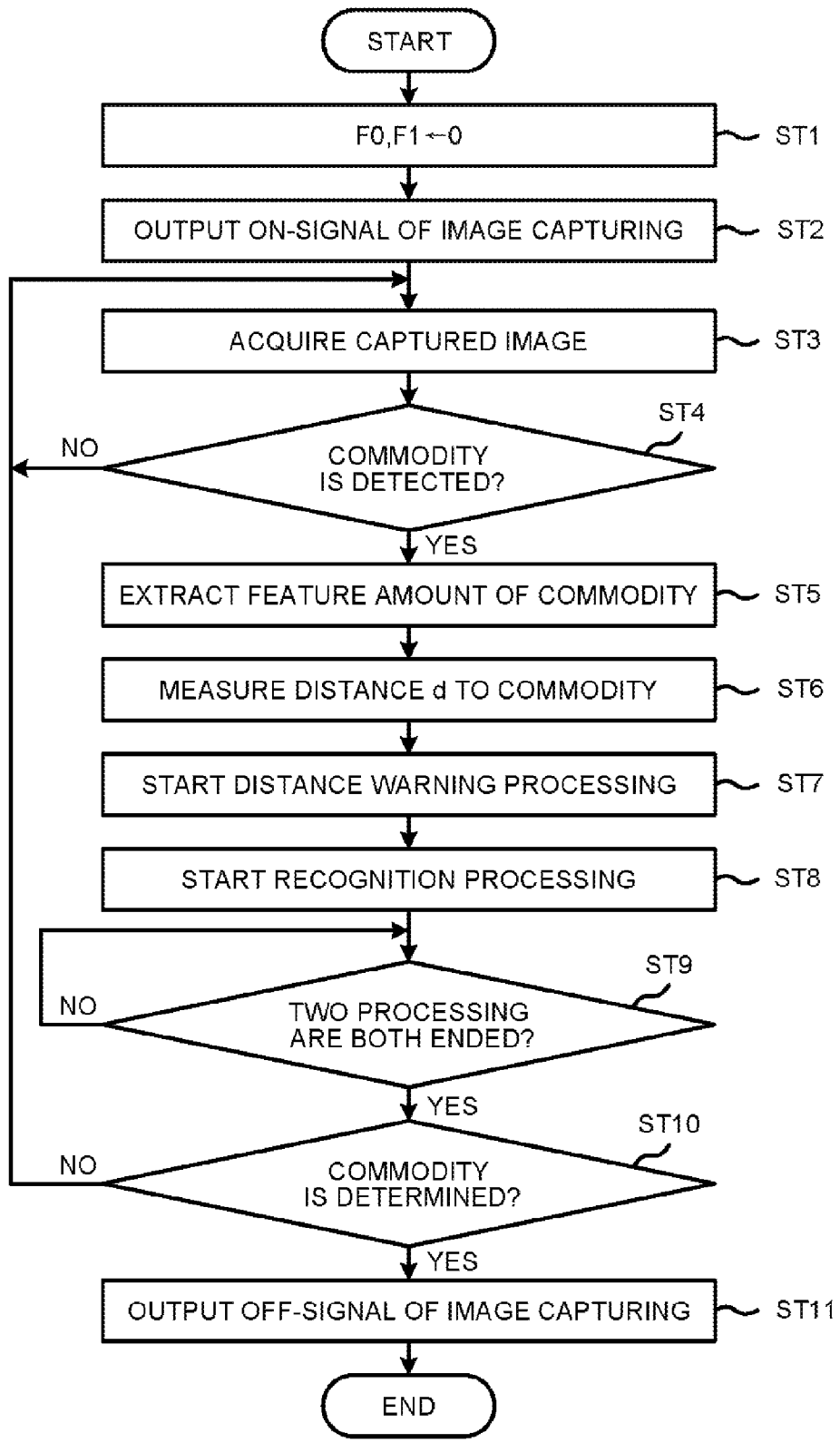
FIG. 8 is a flowchart illustrating a main procedure of an information processing executed by a CPU of the scanner apparatus in accordance with a commodity recognition program.
Figure 11:
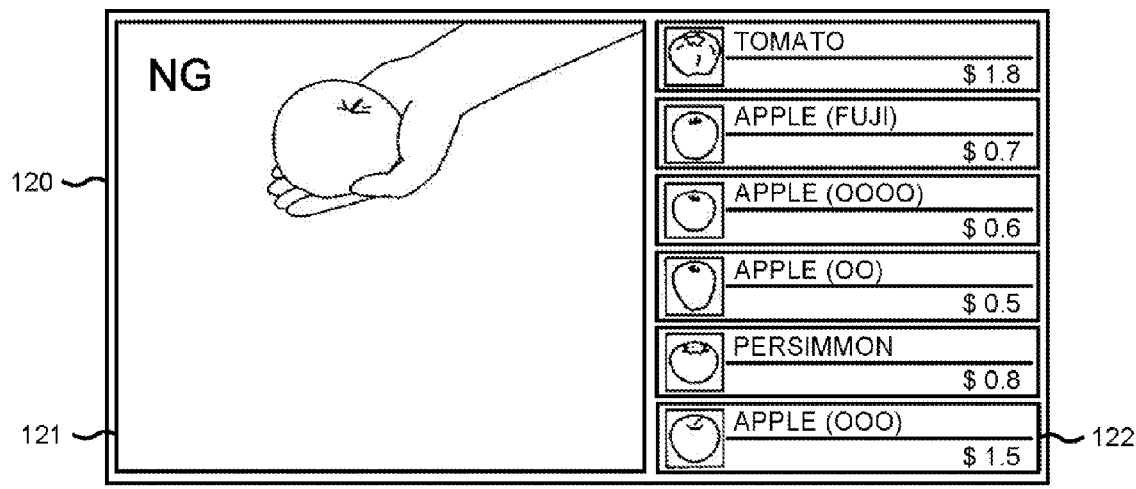
FIG. 11 is a diagram illustrating an example of a screen displayed on a touch panel when the distance between a commodity and an image capturing section is far.

FIG. 11 illustrates an example of a screen 120 displayed on the touch panel in case that the distance d between a commodity M held to the reading window 1B and the image capturing section 14 is longer than the maximum proper distance Dmax set in the proper distance file 40. The screen 120 is divided into an image display area 121 and a commodity candidate area 122. In the image display area 121, the frame image acquired in ACT ST3 in FIG. 8 is displayed. In the commodity candidate area 122, P (P=6 in FIG. 11) commodity items are displayed in a selectable manner as candidates of a registration commodity through the process in ACT ST47 in FIG. 10. Further, in the image display area 121, a character 'NG' representing an improper distance is displayed through the process in ACT ST25 in FIG. 9.

Figure 12:
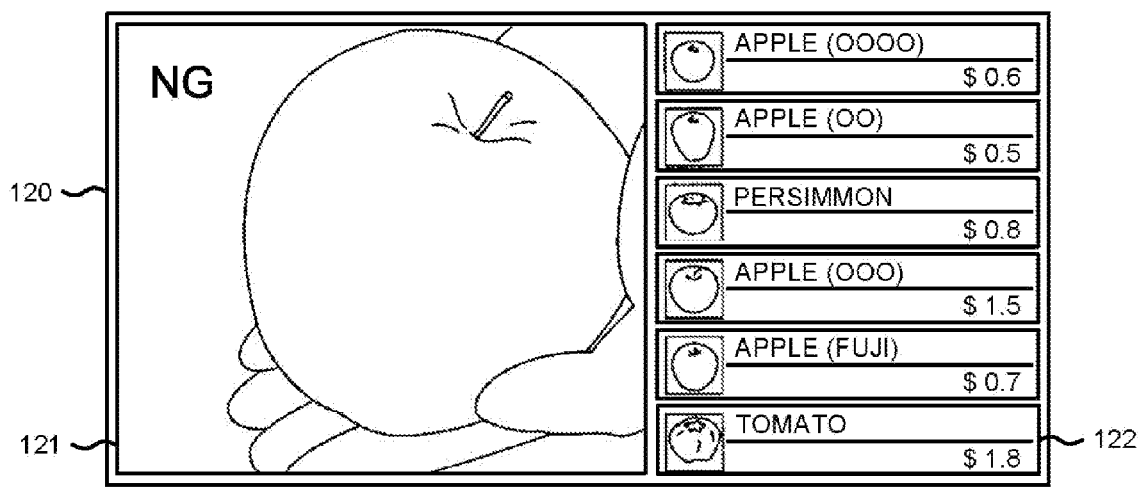
FIG. 12 is a diagram illustrating an example of a screen displayed on a touch panel when the distance between a commodity and an image capturing section is short.

FIG. 12 illustrates an example of a screen 120 displayed on the touch panel in case that the distance d between a commodity M held to the reading window 1B and the image capturing section 14 is shorter than the minimum proper distance Dmin set in the proper distance file 40. The screen 120 is divided into an image display area 121 and a commodity candidate area 122. In the image display area 121, the frame image acquired in the process in ACT ST3 shown in FIG. 8 is displayed. In the commodity candidate area 122, P (P=6 in FIG. 12) commodity items are displayed in a selectable manner as candidates of a registration commodity through the process in ACT ST47 in FIG. 10. Further, in the image display area 121, a character 'NG' representing an improper distance is displayed through the process in ACT ST25 in FIG. 9.

Figure 13:
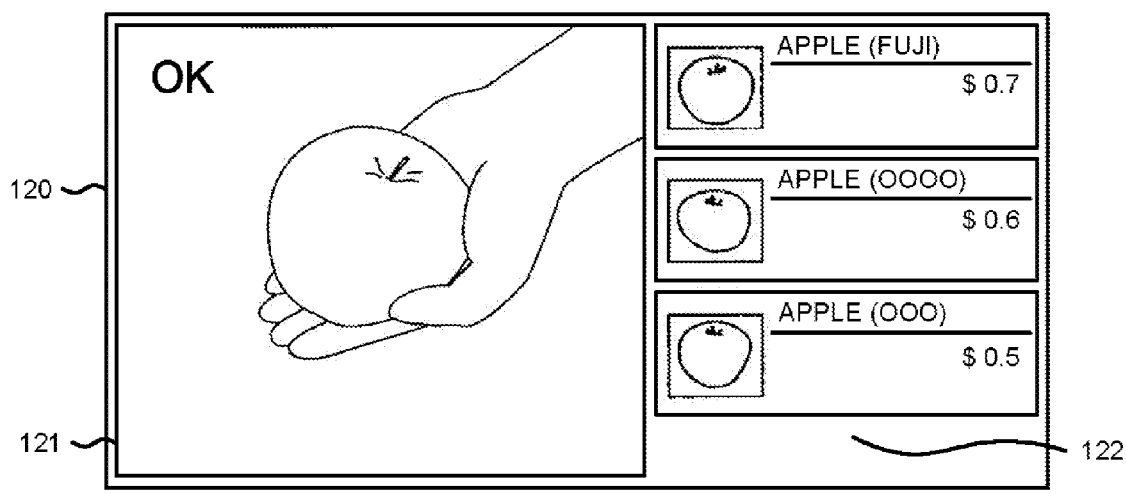
FIG. 13 is a diagram illustrating an example of a screen displayed on a touch panel when the distance between a commodity and an image capturing section is within a proper range.

FIG. 13 illustrates an example of a screen 120 displayed on the touch panel in case in which the distance d between a commodity M held to the reading window 1B and the image capturing section 14 is within the minimum proper distance Dmin and the maximum proper distance Dmax set in the proper distance file 40, that is, the distance d is in a proper range. The screen 120 is divided into an image display area 121 and a commodity candidate area 122. In the image display area 121, the frame image acquired in ACT ST3 shown in FIG. 8 is displayed. In the commodity candidate area 122, Q (Q=3, in FIG. 13) commodity items are displayed in a selectable manner as candidates of a registration commodity through the process in ACT ST49 in FIG. 10. Further, in the image display area 121, a character 'OK' representing a proper distance is displayed through the process in ACT ST29 in FIG. 9.

As shown in FIG. 11 or FIG. 12, in case that the distance d between a commodity M and the image capturing section 14 is not in a proper range, a relatively great number (6, in FIG. 11 and FIG. 12) of commodities are displayed in a selectable manner as candidates of a registration commodity in the descending order of similarity degrees. Therefore, there is a high possibility that the commodity M is contained in the candidates of a registration commodity. If the commodity M is contained in the candidates of a registration commodity, a user selects the commodity by touching the commodity displayed. In this way, the commodity M is determined to be a sales commodity, and the sales of the commodity M is registered in the POS terminal 2.

If the commodity M is not contained in the candidates of a registration commodity, the user is informed by the character 'NG' on the screen 120 that the distance d between the commodity M and the image capturing section 14 is not proper. Then, the user moves the commodity M closer to or away from the reading window 1B. If the distance d between the commodity M and the image capturing section 14 falls into a proper range, the number of the commodities displayed as candidates of a registration commodity is reduced, as shown in FIG. 13. However, the recognition rate becomes high because the distance d between the commodity M and the image capturing section 14 is in a proper range. Thus, there is a high possibility that the commodity M is included in the candidates of a registration commodity. When the distance d between the commodity M and the image capturing section 14 falls into a proper range, a character 'OK' is displayed on the screen 120, and thus, the user can easily know that the distance d is in a proper range. In a case in which the commodity M is included in the candidates of a registration commodity, the user selects the commodity by, for example, touching the commodity displayed. In this way, the commodity M is determined to be a sales commodity, and the sales of the commodity M is registered in the POS terminal 2. In this case, the number of the candidates of a registration commodity is smaller than that obtained if the distance d is beyond the proper range, thus, it is easy to retrieve the commodity M.

Further, if the distance d between the commodity M and the image capturing section 14 falls into a proper range, it is determined whether or not the highest similarity degree of the candidates of a registration commodity is greater than the determination threshold value Lmax. If the highest similarity degree is greater than the determination threshold value Lmax, the commodity having the highest similarity degree is automatically determined as a sales commodity, and the sales of the determined commodity is registered in the POS terminal 2. As stated above, since the distance between the commodity M and the image capturing section 14 is in a proper range, the recognition rate is high, and thus, the commodity having the highest similarity degree greater than the determination threshold value Lmax at the moment is the commodity M held to the reading window 1B without doubt. Therefore, the commodity can be determined as a sales commodity without selecting the commodity M from the candidates of a registration commodity by a user.

In addition, the present invention is not limited to the aforementioned embodiment.

For example, in the aforementioned embodiment, the distance determination element 75 determines whether or not the distance d measured by the distance measurement unit 74 is a proper value, and the changing element 77 changes the number of the commodities displayed as candidates of a registration commodity depending on a case that if the distance is a proper value or if the distance is not a proper value. As to this point, a table is prepared in which the number of the commodities displayed as candidates of a registration commodity is set in association with distance ranges set in a step manner such as 0 cm-10 cm, 10 cm-20 cm and 20 cm-30 cm. Then, the distance determination unit 75 may retrieve the distance range in which the distance d measured by the distance measurement element 74 is included, and the changing element 77 may take the commodities the number of which is set in association with the corresponding distance range as candidates of a registration commodity.

Further, in the aforementioned embodiment, the scanner apparatus 1 includes all the functions of a commodity recognition apparatus. However, all the functions of a commodity recognition apparatus may be divided into the scanner apparatus 1 and the POS terminal 2. Alternatively, the scanner apparatus 1 may be incorporated into the POS terminal 2 as an integrated apparatus, and the integrated apparatus may include all the functions of a commodity recognition apparatus. Further, the commodity recognition program for achieving the functions of the present invention may be completely or partially stored in an external apparatus such as a store server. Furthermore, a stationary type scanner is applied to the present embodiment, but a portable scanner may also be applicable.

In the aforementioned embodiment, the commodity recognition program for realizing the present invention is previously stored in the ROM serving as a program storage section in the apparatus. However, the present invention is not limited to this; the same program may be downloaded to the apparatus from a network. Alternatively, the same program stored in a storage medium may be installed in the apparatus. The storage medium may be in any form as long as the storage medium can store programs like a CD-ROM and a memory card and is readable by an apparatus. Further, the functions realized by an installed or downloaded program can also be achieved through cooperation with an OS (Operating System) installed in the apparatus. Moreover, the program described in the present embodiment may be incorporated in a portable information terminal such as a portable telephone having a communication function or the called PDA to realize the functions.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity recognition apparatus, comprising:
an interface that accesses a recognition dictionary file which stores feature amount data representing surface information for each of a plurality of recognition target commodities obtained from reference images of each recognition target commodity captured from a proper distance;
an image capturing section that captures an image of a commodity;
a distance measurement unit that measures a distance from the image capturing section to the commodity captured by the image capturing section; and
a processor, wherein the processor is configured to:
extract an appearance feature amount of the commodity contained in the image captured by the image capturing section;
calculate, for each recognition target commodity, a similarity degree representing how similar the appearance feature amount is to the feature amount data by comparing the appearance feature amount extracted by the feature amount extraction unit with the feature amount data of the recognition dictionary file;
set recognition target commodities having the similarity degree greater than or equal to a first threshold as candidates of a recognized commodity;
determine whether the distance measured by the distance measurement unit is a proper value;
if the measured distance is not a proper value, select and output a first number of recognition target commodities in a descending order of the similarity degree from among the candidates of the recognized commodity; and
if the measured distance is a proper value, select and output a second number of recognition target commodities in a descending order of the similarity degree from among the candidates of the recognized commodity, the second number being smaller than the first number.

2. The commodity recognition apparatus according to claim 1, wherein the processor is further configured to:
determine the recognition target commodity selected from the output first number or second number of candidates of the recognized commodity as a commodity photographed by the image capturing section.

3. The commodity recognition apparatus according to claim 1, wherein the processor is further configured to:
determine, in a case where the distance is the proper value and a highest similarity degree of the recognition target commodity set as the candidate of the recognized commodity is greater than a second threshold that is greater than the first threshold, the commodity having the highest similarity degree as a commodity photographed by the image capturing section.

4. The commodity recognition apparatus according to claim 1, wherein the processor is further configured to output a warning if the distance is not the proper value.

5. A commodity recognition method executed by a commodity recognition apparatus comprising:
an interface that accesses a recognition dictionary file which stores feature amount data representing surface information for each of a plurality of recognition target commodities obtained from reference images of each recognition target commodity captured from a proper distance;
an image capturing section that captures an image of a commodity;
a distance measurement unit that measures a distance from the image capturing section to the commodity captured by the image capturing section; and
a processor;
wherein the processor is configured to:
extract an appearance feature amount of the commodity contained in the image captured by the image capturing section;
calculate, for each recognition target commodity, a similarity degree representing how similar the appearance feature amount is to the feature amount data by comparing the appearance feature amount extracted by the feature amount extraction unit with the feature amount data of the recognition dictionary file;
set recognition target commodities having the similarity degree greater than or equal to a first threshold as candidates of a recognized commodity;
determine whether the distance measured by the distance measurement unit is a proper value;
if the measured distance is not a proper value, select and output a first number of recognition target commodities in a descending order of the similarity degree from among the candidates of the recognized commodity; and
if the measured distance is a proper value, select and output a second number of recognition target commodities in a descending order of the similarity degree from among the candidates of the recognized commodity, the second number being smaller than the first number.

6. The commodity recognition apparatus according to claim 5, further comprising:
a storage device that stores a range of distance having a recognition rate greater than or equal to a predetermined rate relative to the proper distance as a proper range,
wherein the processor is configured to determine whether the distance measured by the distance measurement unit falls within the proper range as the proper value.

* * * * *